United States Patent
Schaefer et al.

(10) Patent No.: US 7,128,464 B2
(45) Date of Patent: Oct. 31, 2006

(54) METHOD AND DEVICE FOR REGULATING PRESSURE IN A SINGLE-SCREW DEGASSING EXTRUDER OR IN A CASCADE EXTRUDER

(75) Inventors: Bernhard Schaefer, Gross-Gerau (DE); Michael Meier-Kaiser, Alsbach (DE)

(73) Assignee: Roehm GmbH & Co.KG, Darmstadt (DE)

( * ) Notice: Subject to any disclaimer, the term of this patent is extended or adjusted under 35 U.S.C. 154(b) by 148 days.

(21) Appl. No.: 10/478,208

(22) PCT Filed: Apr. 15, 2002

(86) PCT No.: PCT/EP02/04148

§ 371 (c)(1),
(2), (4) Date: Nov. 28, 2003

(87) PCT Pub. No.: WO02/096619

PCT Pub. Date: Dec. 5, 2002

(65) Prior Publication Data

US 2004/0151058 A1 Aug. 5, 2004

(30) Foreign Application Priority Data

May 30, 2001 (DE) ................ 101 26 502
Jun. 22, 2001 (DE) ................ 101 29 707

(51) Int. Cl.
*B29B 7/72* (2006.01)
(52) U.S. Cl. .............. 366/77; 366/79; 366/100
(58) Field of Classification Search ......... 366/76.1–77, 366/79–85, 91, 100; 425/203, 204, 208, 425/209

See application file for complete search history.

(56) References Cited

U.S. PATENT DOCUMENTS

| 3,704,972 A | | 12/1972 | Kneller et al. |
| 4,309,114 A | * | 1/1982 | Klein et al. ............ 366/79 |
| 4,902,455 A | * | 2/1990 | Wobbe ............... 366/75 |
| 4,959,186 A | | 9/1990 | Dollhopf et al. |

(Continued)

FOREIGN PATENT DOCUMENTS

CH     542 047     9/1973

(Continued)

OTHER PUBLICATIONS

Patent Abstracts of Japan vol. 014, No. 113 (M-0944), Mar. 2, 1990 & JP 01 314134 A (Japan Steel Works Ltd: The), Dec. 19, 1989 abstract.

(Continued)

*Primary Examiner*—Charles E. Cooley
(74) *Attorney, Agent, or Firm*—Oblon, Spivak, McClelland, Maier & Neustadt, P.C.

(57) ABSTRACT

The invention relates to a method for regulating the minimal value of the pressure in the first half of the metering zone in a direction of conveyance in a single-screw degassing extruder or in a cascade extruder during the conveying of a melt consisting of a thermoplastic. The single-screw degassing extruder or the cascade extruder each have a first screw section (13), a degassing zone (14), a metering zone (22), and a measuring control loop (M), which includes a pressure measuring sensor (P) in the first half of the metering zone, a regulator (R) and an actuator (S) for influencing the pressure in the metering zone. The pressure is measured by the pressure measuring sensor (P) and is set by the regulator (R) and the actuator (S) so that the minimal value at the location of measurement ranges from 0.1 to 10 bar.

36 Claims, 5 Drawing Sheets

U.S. PATENT DOCUMENTS

| | | | | |
|---|---|---|---|---|
| 5,267,847 | A | * | 12/1993 | Bohm et al. .................. 366/77 |
| 5,378,415 | A | * | 1/1995 | Gohlisch et al. .............. 366/75 |
| 5,518,672 | A | * | 5/1996 | Luker ........................ 425/145 |
| 5,651,944 | A | * | 7/1997 | Schulz et al. ................. 366/85 |
| 6,129,450 | A | * | 10/2000 | Braun ......................... 366/83 |
| 6,406,174 | B1 | * | 6/2002 | Bacher et al. ................ 366/82 |
| 2001/0040837 | A1 | * | 11/2001 | Bacher et al. ................ 366/82 |
| 2004/0151058 | A1 | * | 8/2004 | Schafer et al. ............. 366/100 |

FOREIGN PATENT DOCUMENTS

| | | |
|---|---|---|
| DE | 37 44 193 | 1/1989 |
| JP | 60-214919 | 10/1985 |
| JP | 01-314134 | 12/1989 |
| JP | 2-263609 | * 10/1990 |
| JP | 11-300811 | * 11/1999 |

OTHER PUBLICATIONS

Patent Abstracts of Japan vol. 010, No. 070 (M-462), Mar. 19, 1986 & JP 60 214919 A (Asahi Kasei Kogyo KK), Oct. 28, 1985 abstract.
R. Stehr & P. Andersen: "Controlling a Gear Pump Assisted Degassing Extruder via dual Pressure Sensing" ANTEC, vol. 1, May 3-7, 1992, pp. 416-420, XP002217050 Detroit, USA cited in the application p. 416, right-hand column, line 6-p. 417, right-hand column last line; figures.

* cited by examiner

METHOD AND DEVICE FOR REGULATING PRESSURE IN A SINGLE-SCREW DEGASSING EXTRUDER OR IN A CASCADE EXTRUDER

BACKGROUND OF THE INVENTION

1. Field of the Invention

The invention relates to a method and device for controlling the pressure in a vented single-screw extruder or a cascade extruder.

2. Description of the Background

The extrusion of thermoplastics to form shaped bodies, such as sheets or films, generally takes place using a vented single-screw extruder if volatile constituents, which have an adverse effect on the properties of the extrudate which is to be produced, are to be separated out during the extrusion process. These volatile constituents may, for example, be water, monomers or oligomers. In the vented single-screw extruder, the plastic which is in granule form is initially melted, compressed and homogenized in a first screw section, comprising a feed section, a compression zone and a first homogenization zone (referred to below as the introduction zone) and is then fed to a second screw section, which comprises a low-cut venting zone and a metering section, in which the melt is vented, compressed and conveyed into an extrusion die, from which the melt then emerges in the desired form.

An alternative design is what is known as the cascade extruder. In this arrangement, the screw is divided, in accordance with the abovementioned two screw sections, into two successive single screws with separate drives. The rotational speeds of the two screws are usually kept in a fixed ratio.

Extruders of the type described are usually equipped with a temperature-control system which allows heat to be supplied or dissipated via the barrel, in order to set the temperature in the region of the screw in the desired way. The temperature can be controlled by means of a heat transfer liquid, the temperature of which is in turn controlled by means of known heating/cooling equipment. Combinations of electrical heating and air or water cooling are often also used. Controlling the temperature by means of a thermocouple in the barrel, which actuates a controller which in turn initiates the supply or dissipation of heat, forms part of the prior art.

To allow temperature control which is as well matched to the demands of the process as possible, the temperature control over the length of the extruder is usually divided into a greater number of independently controllable zones.

DE-C 27 58 265 describes a control device for monitoring the filling level of a venting opening at an extruder for processing molten low-density polyethylene.

DE-C 37 44 193 describes a method for venting a thermoplastic melt over a wide viscosity range using a plurality of venting stages which are connected in series.

Stehr, R. and Andersen, P., in ANTEC '92, pp. 416–420: "Controlling a Gear Pump Assisted Degassing Extruder via Dual Pressure Sensing", describe a device comprising a vented single-screw extruder with connected melt gear pump. The vented single-screw extruder with first and second screw sections has a measurement control circuit for maintaining a predetermined pressure at the end of the metering section, the intention being to ensure that the corresponding extruder zone is filled with melt but no melt emerges from the venting opening. The pressure diagrams show high pressures, around 30 bar, for the first half of the metering section ($p_m$). The pressures downstream of the screw tip ($p_s$) are shown to be lower and apparently undergo considerable periodic fluctuations in the range between 15 and 30 bar. There is no suggestion that the pressure be controlled in the first half of the metering section, with the aim of avoiding partial filling with melt there.

A critical point in designing the screw geometry of a vented single-screw extruder and in defining the ratio of the screw rotational speeds in a cascade extruder is that of matching the transport behaviour of the two screw sections. In doing so, it is necessary to ensure that in any operating state of the extruder (plastic, output and temperature), the second section can transport away more melt than the first section supplies.

Otherwise, melt emerges from the venting section, which generally causes the process to fail (the installation has to be stopped in order to clean the venting section and then started up again). To ensure that the extruder can be used over a wide operating range, the transport behaviour of the two sections is usually set in such a way that the second section has considerably better transport properties than the first section, so that even in critical operating states it is reliably possible to prevent melt from escaping from the venting section. This means that it is often the case that not only the low-cut venting zone, but also a part of the metering section which is of some length are only partially filled, i.e. melt is located only directly ahead of the sliding flank of the screw flight. Consequently, plastic can accumulate in the regions which are not permanently filled with melt. Particularly if irregularities occur in the transporting of the melt during extrusion, it may be the case that partial quantities of the melt remain in the extruder for an excessively long time, where they are exposed to the high temperatures produced in contact with the inner surface of the screw. This may cause some of the melt to be converted into a gel-like mass or even, in the event of relatively unfavourable conditions, into carbon-like deposits. These deposits are to some extent detached again during extrusion and as a result pass into the melt as undesired impurities.

The problems described occur both while the extrusion process is ongoing, as a result of fluctuations in the transport behaviour of the first screw section, and also, in particular, in the event of considerable changes in the operating point, as caused by a change in the output or in the plastic which is being processed.

Moreover, the problems which have been described mean that, when the processed plastic is changed, if the two plastics are incompatible, it is imperative that the screw be dismantled and cleaned, which is a complex process. Otherwise, impurities caused by the plastic which was previously processed will occur even a relatively long time after the plastic has been changed.

Only the carbon-like deposits which were described above can be at least partially separated out by using standard melt-filtration systems. Removal of gel-like impurities or of other plastics with similar processing temperatures is not possible.

Particularly transparent products, with high demands imposed on the visual properties, can be made unusable by these impurities.

Generally, a melt pump for keeping the flow rate constant and filter units for separating impurities out of the melt are located between the vented single-screw extruder or the cascade extruder and the extrusion die.

To match the flow rates of extruder and melt pump, the pressure between the extruder tip and the melt pump is usually measured as a control variable and is regulated to a predetermined set value by means of the extruder screw rotational speed as adjustable value (cf. for example the Konrad Kerres dissertation, Augustinus Verlag, Aachen, 1995). This control arrangement is used to compensate for changes in the transport behaviour of the extruder, for example caused by the temperature in the feed section or changes in the characteristics of the plastic (apparent density, feed behaviour).

A measure of the uniformity of the melt transport in the melt pump is the pressure downstream of the pump. The aim of combining the extruder and melt pump is to limit the pressure fluctuations downstream of the pump to less than ±5%. This aim can be achieved if the pressure upstream of the gear pump changes by no more than ±20%. Greater fluctuations in the pressure upstream of the pump have effects on the uniformity of transport and therefore the pressure downstream of the pump.

The fluctuations in the pressure upstream of the pump are usually compensated for by the above-described control of the rotational speed of the extruder screw. In the case of vented single-screw extruders or cascade extruders with an essentially only partially filled second metering section, however, relatively high-frequency pressure fluctuations may occur and cannot be eliminated by control means. The pressure fluctuates with the frequency of the rotational speed of the screw. On the one hand, this disrupts the above-described control of the pressure upstream of the pump and, on the other hand, causes fluctuations in the flow rate, which may have effects on the geometry of the extrudate produced.

The set value for the pressure upstream of the melt pump is usually input by the machine operator in such a way that, on the one hand, the pump provides a build-up of pressure (this is imperative on account of the design principle of most pumps, which use the transported melt as lubricant), while on the other hand a maximum pressure, which results from the permissible locking forces at the flange between extruder and melt pump, must not be exceeded.

SUMMARY OF THE INVENTION

The avoidance of impurities in the melt is becoming increasingly important in the extrusion of semifinished products, such as sheets or films made from thermoplastic, particularly when using transparent or translucent thermoplastics, since high demands are often imposed with regard to a perfect optical quality of the extruded semifinished products. Impurities may, for example, be introduced with the granules in the form of dirt particles or may form during the processing of the melt.

It is known to separate out such impurities by means of downstream melt filters. However, it is very difficult to separate out gel-like impurities or impurities produced by other plastics. If excessive amounts of impurities are present in the end product, the quality of the latter is often adversely affected or altogether inadequate. Particularly in the case of transparent films, even slight defects lead to flaws which can easily be seen and are unacceptable if the quality demands are high. It is fundamentally the case that it is better as far as possible to avoid the impurities, rather than having to remove them at a later stage.

The invention is based on the observation that, in the case of vented single-screw extruders or cascade extruders, deposits which originate from the melt are often found on the front screw turns in the region of the first half of the metering section.

It is assumed that, while the extruder is operating, operating states in which parts of the screw which are not permanently filled with melt come into contact with melt may constantly occur. In these areas, the melt is no longer transported or is only transported poorly. It can stop moving, so that it is exposed to the high temperatures for longer than would be the case in the standard operating state. The deposited melt may change into the gel state which has already been described above or, if the residence time is even longer, may be converted into carbon-like deposits.

If an operating state in which larger sections of the screw are wetted with melt then occurs again, the gel-like or carbon-like deposits are at least partially entrained and enter the product as impurities.

Figure 1A:
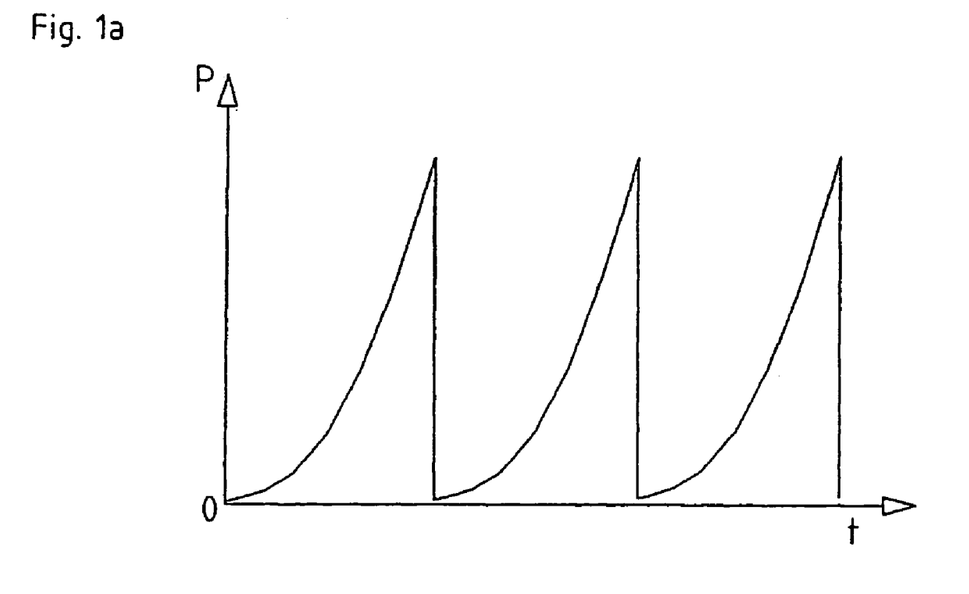

The partial filling of the screw in the region of the metering section can be detected by checking the pressure profile over the course of time. A typical pressure profile in the region of the metering section over the course of time with a partially filled screw is illustrated in FIG. 1a. The figure shows a sawtooth function with phases of a constant, minimum pressure. The minimum pressure corresponds to the pressure in the venting zone, i.e. is usually below atmospheric pressure of 1 bar. The regular rise in the pressure is caused by the melt in front of the sliding screw flank and the screw flight, which move past beneath the pressure sensor. After the screw flight, the pressure falls back to the minimum level. Accordingly, the pressure changes with the product of screw rotational speed and number of screw turns.

It is considered to be an object of the present invention to reduce or if possible avoid altogether the deposits which have been described. The object is achieved by a method for controlling the minimum level of the pressure in the first half of the metering section, as seen in the transport direction, in a vented single-screw extruder or a cascade extruder during the transport of a molten thermoplastic, the vented single-screw extruder or the cascade extruder in each case having a first screw section (15), a venting zone (14), a metering section (22) and a measurement control circuit (M), which includes a pressure-measuring sensor (M) in the first half of the metering section, a controller (R) and an actuator (S) for influencing the pressure in the metering section, characterized in that the pressure is measured by means of the pressure-measuring sensor (M) and is set by means of the controller (R) and the actuator (S) in such a way that the minimum level at the location of the measurement is between 0.1 and 10 bar.

BREIF DESCRIPTION OF THE DRAWINGS

The invention is explained by the following figures:

FIG. 1a

Diagrammatic illustration of the pressure profile over time (t) in the region of the front half of the metering section, without control

FIG. 1b

Diagrammatic illustration of the pressure profile over the course of time (t) in the region of the front half of the metering section with control in accordance with the invention

FIG. 2a

Diagrammatic illustration of one possible design of the invention for a vented single-screw extruder List of reference symbols:

1. Pressure-measuring sensor (S) in the first half of the metering section

2. Measurement amplifier for filtering out the minimum pressures
4. Controller ($P_1$: set value)
5. Controller (PI controller)
7. Controller (actual value of the screw rotational speed)
9. Extruder motor (drive)
10. Extruder transmission
11. Screw barrel
12. Material hopper
13. First screw section (introduction zone)
14. Venting zone
15. Feed zone
16. Melt pump
17. Extrusion die
18. $P_5$: Pressure-measuring sensor downstream of the melt pump
19. $P_4$: Pressure-measuring sensor upstream of the melt pump
20. $P_3$: Pressure-measuring sensor upstream of the flow restrictor/downstream of the screw
21. $P_2$: Pressure-measuring sensor in the metering section
22. Second screw section (metering section)

FIG. 2b

Diagrammatic illustration of a possible design of the invention for a vented single-screw extruder with an additional measurement control circuit (M2). Reference symbols as in FIG. 2a. The second measurement control circuit (M2) comprises the pressure-measuring sensor (19), measurement amplifier (23) and the controllers (7, 24).

FIG. 2c

Diagrammatic illustration of a possible design of the invention for a single-screw extruder. Reference symbols as in FIG. 2a. An adjustable flow restrictor is shown as (25).

FIG. 2d

Diagrammatic illustration of a possible design of the invention. Reference symbols as in FIG. 2c. A restrictable bypass is shown as elements (26, 27) as a replacement for the melt gear pump (16) in FIG. 2a and 2b.

The invention relates to methods for controlling the minimum level of the pressure in the first half of the metering section, as seen in the transport direction, in a vented single-screw extruder or a cascade extruder during the transport of a molten thermoplastic. The vented single-screw extruder or the cascade extruder in each case has a first screw section (15), a venting zone (14), a second screw section corresponding to the metering section (22), and a measurement control circuit (M), which includes a pressure-measuring sensor (P) in the first half, preferably in the first third, particularly preferably in the first quarter of the metering section (22), a controller (R) and an actuator (S) for influencing the pressure in the metering section. The pressure is measured by means of the pressure-measuring sensor (1) and is set by means of the controller (R) and the actuator (S) in such a way that the minimum level at the location of the measurement is between 0.1 and 10 bar.

Figure 1B:
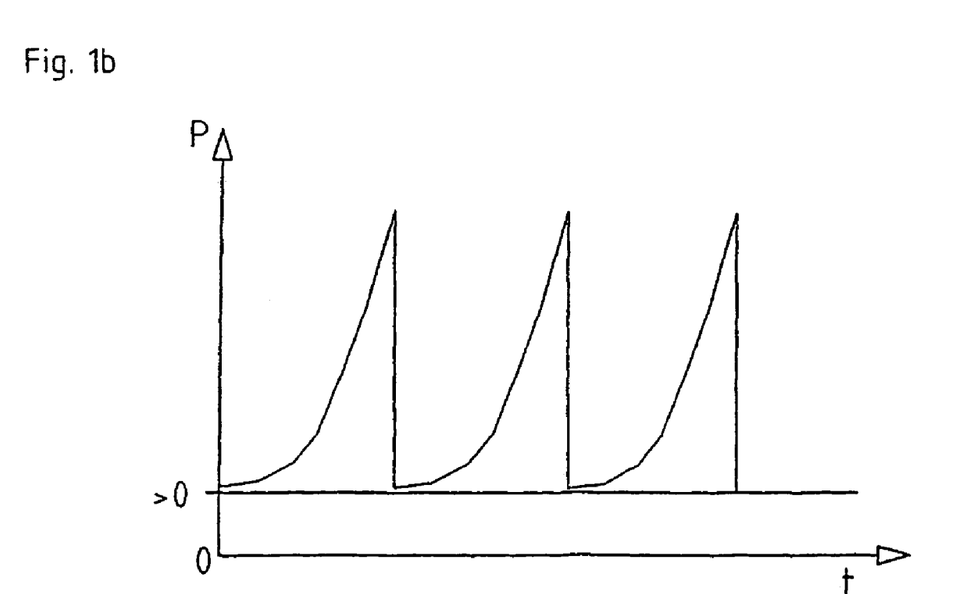

Without control, a pressure diagram as shown in FIG. 1a is obtained, but with control a pressure diagram corresponding to that shown in FIG. 1b is obtained.

DETAILED DESCRIPTION OF THE INVENTION

Vented Single-Screw Extruder or Cascade Extruder

The method according to the invention is suitable for vented single-screw extruders or what are known as cascade extruders, since the problem which is to be solved occurs in both systems. A vented single-screw extruder has a screw which is driven by a motor and has an introduction zone with a first screw section (15), a metering section (22) and a venting zone (14) arranged therebetween. The metering section (22) begins directly after the venting zone (14) and extends as far as the end of the screw or to the screw tip. The vented single-screw extruder can also be operated as a melt extruder if it is fed with melt instead of solid granules.

The cascade extruder can be regarded as a special or alternative design of the vented single-screw extruder. The two screw sections are divided into two successive single screws with separate drives. The rotational speeds of the two screws are usually kept in a fixed relationship, but may also be controlled separately. The metering section (22) in the cascade extruder corresponds to the length of its second screw or the second screw section.

The Measurement Control Circuit (M)

The pressure-measuring sensor is part of a measurement control circuit (M), which includes a pressure-measuring sensor (P) in the first half of the metering section, a controller (R) and an actuator (S) for influencing the pressure in the metering section. It is preferable for there to be a measurement amplifier (2) which filters out the minimum level of the pressure and provides this value for control purposes.

The screw drive (9) may preferably be equipped with a rotation sensor, which is located on the drive itself or on a shaft which runs synchronously with the drive, and the rotation signal is taken into account in the controlling of the minimum level of the pressure. In this way, the pressure-minimum signal can be tapped in a more simple manner in terms of the control technology involved.

The pressure is measured by means of the pressure-measuring sensor (P) and, at the location of measurement, is set via the measurement control circuit (M) by means of the actuating means (S) for influencing the pressure in such a way that it is between 0.1 and 10 bar ($10^4$ to $10\times10^5$ Pascal), preferably between 0.2 and 1 bar (in each case absolute). A pressure upper limit of 5 bar may be appropriate, since this prevents melt from escaping from the venting opening as a result of back-pressure.

By the end of the metering section, the pressure rises in the range from 10 to 250, generally 20 to 50 bar. The pressure in the metering section downstream of the screw tip is always higher than the pressure in the first half of the metering section.

According to the invention, the controlled pressure is always greater than the pressure in the venting section and lower than the pressure at the end of the metering section.

The set value for the pressure is ideally set in such a way that it just still remains the case that no melt escapes from the venting opening. It is therefore substantially dependent on the distance of the pressure sensor from the venting opening and on the screw geometry in this region.

Actuator (S)

By way of example, the drive (9) for controlling the rotational speed of the screw, an adjustable flow restrictor or a restrictable bypass can be used as actuator (S) for influencing the pressure in the metering section. It has also been found that, in the case of relatively large extruders with a screw diameter of >45 mm, the pressure in the first half of the metering section can be influenced by means of the barrel temperature in the region of the metering section, in particular in the second half of the metering section. In the case of the cascade extruder, the drive for controlling the screw rotational speed of the screw which lies downstream in the transport direction or the ratio of the screw rotational speeds of the two screws with respect to one another can be used as actuator (S).

A restrictable bypass would preferably be provided between the second half, or the final third, in particular the final quarter of the metering section and in the region of the pressure-measuring sensor (P) in the first half, preferably in the first third, particularly preferably in the first quarter of the metering section.

Figure 2A:
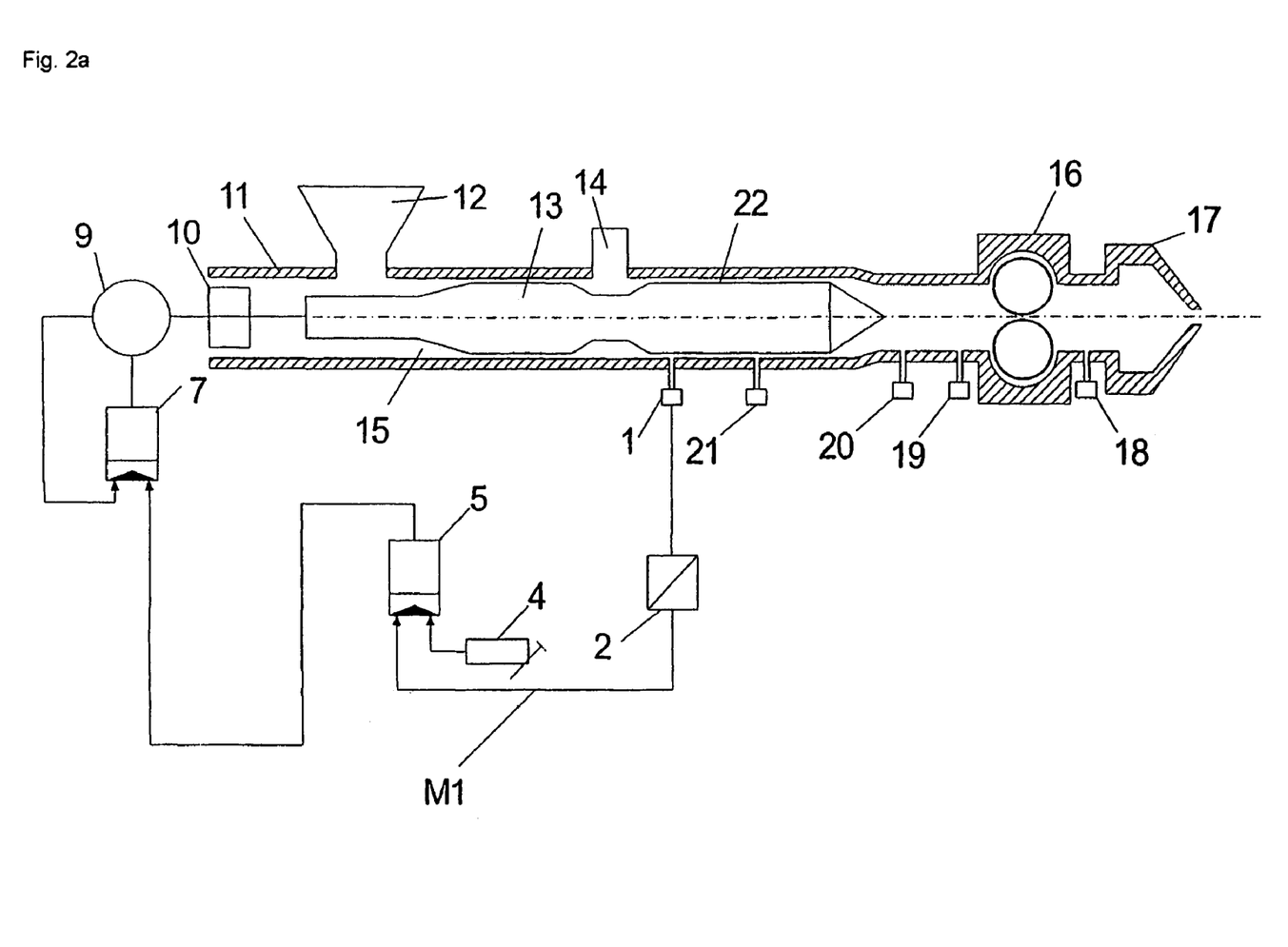

FIG. 2a diagrammatically depicts a device according to the invention with reference to the example of a vented single-screw extruder. The vented single-screw extruder has a first screw section (13), a venting zone (14), a metering section (22). The material hopper (12) for feeding in plastic granules is also illustrated. The measurement control circuit (M=M1) has, as pressure-measuring sensor (P), the pressure-measuring sensor (1), a measurement amplifier (2), as controller (R) the controllers (4), (5) and (7) and, as actuator (S), the drive motor (9).

Additional Measurement Control Circuit M2

Figure 2B:
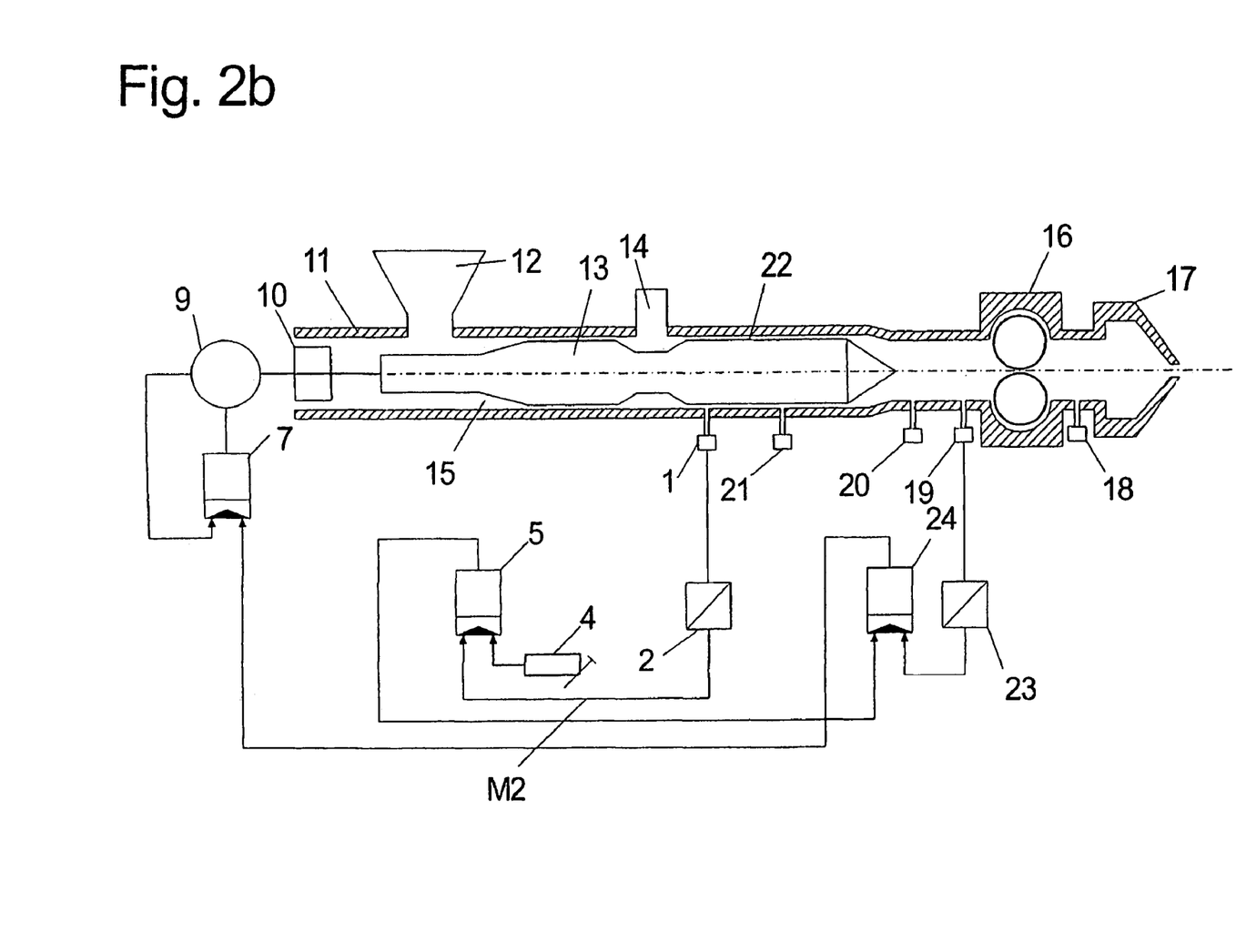
Figure 2C:
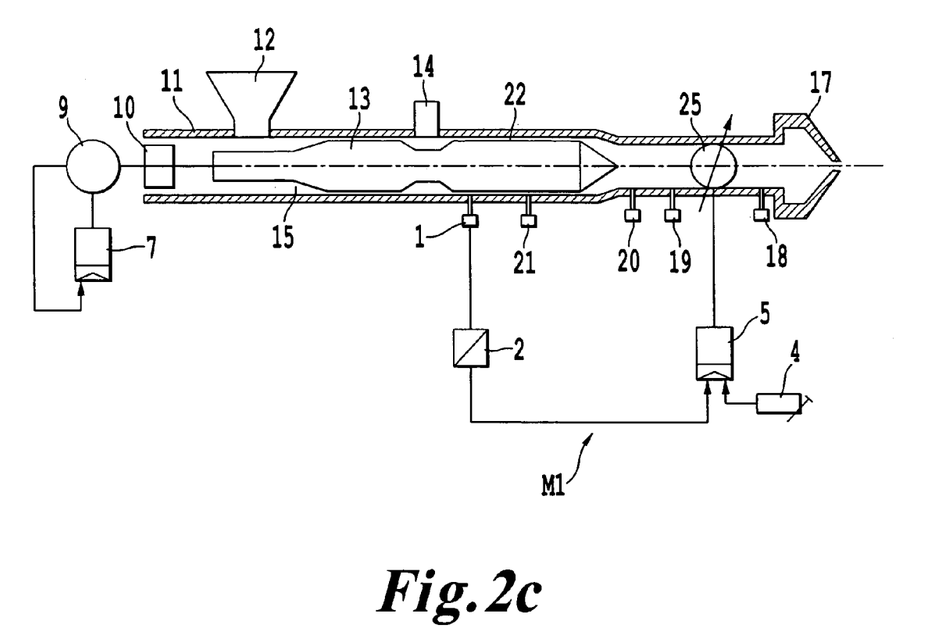
Figure 2D:
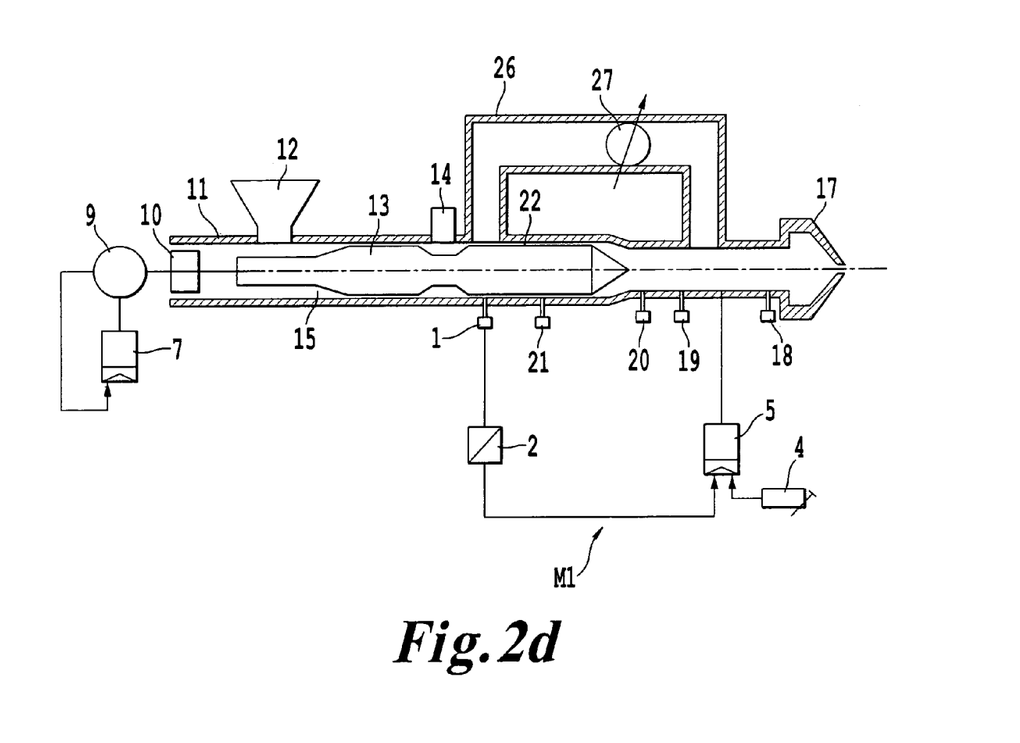

The embodiment shown in FIG. 2b, in which there is a second measurement control circuit (M2), comprising a pressure-measuring sensor (19), which is located downstream of the screw tip in the metering section, the measurement amplifier (23), the controllers (24) and (7) and an actuator (9), is particularly preferred. The pressure which is measured by the pressure-measuring sensor (19) is set by means of the controller (7) and the actuator (9) in such a way that the maximum level of the pressure at the location of the measurement is limited. This has the advantage that pressure peaks which impose a load on the material can be avoided in particular in the start-up phase.

Preferred Embodiments

In the case of a vented single-screw extruder with a melt gear pump (16), which is located downstream of the screw tip or downstream of the metering section (22), the minimum level of the pressure can be controlled in the first half of the metering section as a result of the rotational speed of the drive motor (9) being increased when the pressure is too low.

In the case of a vented single-screw extruder with an adjustable flow restrictor (25), which is located downstream of the screw tip or downstream of the metering section (22), as seen in the transport direction, the minimum level of the pressure can be controlled in the first half of the metering section (22) as a result of the flow restrictor being closed when the pressure is too low.

In the case of a vented single-screw extruder with a restrictable bypass which, in the open state, returns melt from the space downstream of the metering section (22), i.e. downstream of the screw tip, to the first half of the metering section (22), the minimum level of the pressure can be controlled in the first half of the metering section as a result of the bypass being opened when the pressure is too low.

In the case of a vented single-screw extruder with a separately controllable barrel temperature in the metering section, the minimum level of the pressure can be controlled in the first half of the metering section as a result of the barrel temperature of the metering section being increased when the pressure is too low.

In the case of a cascade extruder, the minimum level of the pressure can be controlled in the first half of the metering section (22) as a result of the rotational speed of the drive motor for the screw part in the metering section being reduced when the pressure is too low.

Thermoplastics

The problem on which the invention is based affects practically all thermoplastics which are processed using vented single-screw extruders or cascade extruders. The method is particularly suitable for thermoplastics such as acrylonitrile-butadiene-styrene (ABS), polyethylene terephthalates, polybutylene terephthalates, polyamides, polystyrenes, polymethyl methacrylates, polycarbonates, impact-modified polymethyl methacrylate or other mixtures (blends) of two or more thermoplastics. However, the problem of impurities caused by deposits is particularly relevant to transparent plastics, such as polycarbonate or polymethacrylate or polymethyl methacrylate plastics.

Device

The invention also relates to a device which is a vented single-screw extruder or a cascade extruder and is equipped with a measurement control circuit (M) for carrying out the method according to the invention.

Advantageous Effects of the Invention

The pressure control arrangement according to the invention ensures that the screw turns in the first half of the metering section are completely filled with melt even during unfavourable operating states. This considerably reduces or eliminates the occurrence of the above-described impurities. The filter units can be of less expensive design. The extrusion rate can be increased. Filter change intervals can be lengthened. The product quality is improved. The product output is increased. Manufacturing defects are reduced accordingly.

Further advantages emerge when the moulding compound which is being extruded is changed, particularly in the event of a change between moulding compounds of different colours, in which the moulding compound which was extruded last must first of all be completely discharged with the new moulding compound which is to be extruded, i.e. as it were has to be washed out. In the method according to the invention or using the device according to the invention, residues of the moulding compound which was extruded last can be discharged more quickly by the new moulding compound on account of the improved filling of the screw.

The invention also relates to a corresponding device with which the method according to the invention can be carried out. The device for transporting the melt of a thermoplastic therefore comprises a vented single-screw extruder or a cascade extruder having a first screw section (15), venting zone (14), metering section (22), a pressure-measuring sensor (1) in the first half of the metering section, which is part of a measurement control circuit, and the means (16) for influencing the pressure in the metering section.

EXAMPLE

A test structure corresponding to that shown in FIG. 2a was produced:

A vented single-screw extruder, manufactured by Stork, D=35 mm, L=32 D, with a melt gear pump (16) produced by Maag Pump Systems Extrex Ex 28, was used. The measurement control circuit (M) included, as pressure-measuring sensor (1), a DMS pressure sensor produced by Gneuβ, (0–200 bar), a measurement amplifier for filtering out the minimum pressure levels and a controller which controls the rotational speed of the extruder drive motor as actuator. During the extrusion operation using polymethyl methacrylate as thermo-plastic, the pressure in the first half of the metering section was kept between 0.5 and 6 bar.

In this way, in the event of an attempt to change colour from a transparent moulding compound to an opaque blue moulding compound, the transition was shortened by approximately half (only approx. 5 min instead of 10 min) compared to a test structure without the pressure control according to the invention at the start of the metering section.

The invention claimed is:

1. A method for controlling a minimum level of pressure in a first half of a metering section, as seen in a transport direction, in a vented single-screw extruder or a cascade extruder during transport of a molten thermoplastic, the vented single-screw extruder or the cascade extruder in each case having a first screw section, a venting zone, a metering section and a measurement control circuit, which includes a first pressure-measuring sensor in the first half of the metering section, a first controller and a first actuator for influencing the pressure in the metering section, wherein the pressure is measured by the first pressure-measuring sensor and is set by the first controller and the first actuator such that a minimum level at a location of the measurement is between 0.1 and 10 bar,
wherein the measurement control circuit includes a measurement amplifier that filters out the minimum level of the pressure and provides a value of the minimum level for control purposes.

2. The method according to claim 1, further comprising a screw drive equipped with a rotation sensor, located on the drive itself or on a shaft that runs synchronously with the drive, a rotation signal being taken into account in controlling of the minimum level of the pressure in the first half of the metering section.

3. The method according to claim 1, including a second measurement control circuit, including a second pressure-measuring sensor, located downstream of a screw tip of the metering section, a second controller and a second actuator, and wherein the pressure is measured by the second pressure-measuring sensor and is set by the second controller and the second actuator such that a maximum level of the pressure is limited at a location of measurement.

4. The method according to claim 1, wherein the extruder is a vented single-screw extruder with a melt gear pump, located downstream of the metering section, the minimum level of the pressure being controlled in the first half of the metering section as a result of the rotational speed of the drive motor being increased when the pressure is too low.

5. The method according to claim 1, wherein the extruder is a vented single-screw extruder with an adjustable flow restrictor, located downstream of the metering section, the minimum level of the pressure being controlled in the first half of the metering section as a result of the flow restrictor being closed when the pressure is too low.

6. The method according to claim 1, wherein the extruder is a vented single-screw extruder with a restrictable bypass which, in an open state, returns melt from a space downstream of the metering section to the first half of the metering section, the minimum level of the pressure being controlled in the first half of the metering section as a result of the bypass being opened when the pressure is too low.

7. The method according to claim 1, wherein the extruder is a vented single-screw extruder with separate control of a temperature of a barrel in a region of the metering section, the minimum level of the pressure being controlled in the first half of the metering section as a result of the temperature of the barrel being increased in the region of the metering section when the pressure is too low.

8. The method according to claim 1, wherein the extruder is a cascade extruder and the minimum level of the pressure is controlled in the first half of the metering section as a result of a rotational speed of a drive motor for a screw part in the metering section being reduced when the pressure is too low.

9. The method according to claim 1, wherein the thermoplastic which is processed is a polyethylene terephthalate, a polybutylene terephthalate, a polyamide, a polystyrene, a polymethyl methacrylate, a polycarbonate, impact-modified polymethyl methacrylate or another mixture (blend) of two or more thermoplastics.

10. A method for controlling a minimum level of pressure in a first half of a metering section, as seen in a transport direction, in a vented single-screw extruder or a cascade extruder during transport of a molten thermoplastic, the vented single-screw extruder or the cascade extruder in each case having a first screw section, a venting zone, a metering section and a measurement control circuit, which includes a first pressure-measuring sensor in the first half of the metering section, a first controller and a first actuator for influencing the pressure in the metering section, wherein the pressure is measured by the first pressure-measuring sensor and is set by the first controller and the first actuator such that a minimum level at a location of the measurement is between 0.1 and 10 bar; and
further comprising a screw drive equipped with a rotation sensor, located on the drive itself or on a shaft that runs synchronously with the drive, a rotation signal being taken into account in controlling of the minimum level of the pressure in the first half of the metering section.

11. The method according to claim 10, wherein the measurement control circuit includes a measurement amplifier that filters out the minimum level of the pressure and provides a value of the minimum level for control purposes.

12. The method according to claim 10, including a second measurement control circuit, including a second pressure-measuring sensor, located downstream of a screw tip of the metering section, a second controller and a second actuator, and wherein the pressure is measured by the second pressure-measuring sensor and is set by the second controller and the second actuator such that a maximum level of the pressure is limited at a location of measurement.

13. The method according to claim 10, wherein the extruder is a vented single-screw extruder with a melt gear pump, located downstream of the metering section, the minimum level of the pressure being controlled in the first half of the metering section as a result of the rotational speed of the drive motor being increased when the pressure is too low.

14. The method according to claim 10, wherein the extruder is a vented single-screw extruder with an adjustable flow restrictor, located downstream of the metering section, the minimum level of the pressure being controlled in the first half of the metering section as a result of the flow restrictor being closed when the pressure is too low.

15. The method according to claim 10, wherein the extruder is a vented single-screw extruder with a restrictable bypass which, in an open state, returns melt from a space downstream of the metering section to the first half of the metering section, the minimum level of the pressure being controlled in the first half of the metering section as a result of the bypass being opened when the pressure is too low.

16. The method according to claim 10, wherein the extruder is a vented single-screw extruder with separate control of a temperature of a barrel in a region of the metering section, the minimum level of the pressure being controlled in the first half of the metering section as a result of the temperature of the barrel being increased in the region of the metering section when the pressure is too low.

17. The method according to claim 10, wherein the extruder is a cascade extruder and the minimum level of the pressure is controlled in the first half of the metering section as a result of a rotational speed of a drive motor for a screw part in the metering section being reduced when the pressure is too low.

18. The method according to claim 10, wherein the thermoplastic which is processed is a polyethylene terephthalate, a polybutylene terephthalate, a polyamide, a polystyrene, a polymethyl methacrylate, a polycarbonate, impact-modified polymethyl methacrylate or another mixture (blend) of two or more thermoplastics.

19. A method for controlling a minimum level of pressure in a first half of a metering section, as seen in a transport direction, in a vented single-screw extruder or a cascade extruder during transport of a molten thermoplastic, the vented single-screw extruder or the cascade extruder in each case having a first screw section, a venting zone, a metering section and a measurement control circuit, which includes a first pressure-measuring sensor in the first half of the metering section, a first controller and a first actuator for influencing the pressure in the metering section, wherein the pressure is measured by the first pressure-measuring sensor and is set by the first controller and the first actuator such that a minimum level at a location of the measurement is between 0.1 and 10 bar,
  wherein the extruder is a vented single-screw extruder with a restrictable bypass which, in an open state, returns melt from a space downstream of the metering section to the first half of the metering section, the minimum level of the pressure being controlled in the first half of the metering section as a result of the bypass being opened when the pressure is too low.

20. The method according to claim 19, wherein the measurement control circuit includes a measurement amplifier that filters out the minimum level of the pressure and provides a value of the minimum level for control purposes.

21. The method according to claim 19, further comprising a screw drive equipped with a rotation sensor, located on the drive itself or on a shaft that runs synchronously with the drive, a rotation signal being taken into account in controlling of the minimum level of the pressure in the first half of the metering section.

22. The method according to claim 19, including a second measurement control circuit, including a second pressure-measuring sensor, located downstream of a screw tip of the metering section, a second controller and a second actuator, and wherein the pressure is measured by the second pressure-measuring sensor and is set by the second controller and the second actuator such that a maximum level of the pressure is limited at a location of measurement.

23. The method according to claim 19, wherein the extruder is a vented single-screw extruder with a melt gear pump, located downstream of the metering section, the minimum level of the pressure being controlled in the first half of the metering section as a result of the rotational speed of the drive motor being increased when the pressure is too low.

24. The method according to claim 19, wherein the extruder is a vented single-screw extruder with an adjustable flow restrictor, located downstream of the metering section, the minimum level of the pressure being controlled in the first half of the metering section as a result of the flow restrictor being closed when the pressure is too low.

25. The method according to claim 19, wherein the extruder is a vented single-screw extruder with separate control of a temperature of a barrel in a region of the metering section, the minimum level of the pressure being controlled in the first half of the metering section as a result of the temperature of the barrel being increased in the region of the metering section when the pressure is too low.

26. The method according to claim 19, wherein the extruder is a cascade extruder,and the minimum level of the pressure is controlled in the first half of the metering section as a result of a rotational speed of a drive motor for a screw part in the metering section being reduced when the pressure is too low.

27. The method according to claim 19, wherein the thermoplastic which is processed is a polyethylene terephthalate, a polybutylene terephthalate, a polyamide, a polystyrene, a polymethyl methacrylate, a polycarbonate, impact-modified polymethyl methacrylate or another mixture (blend) of two or more thermoplastics.

28. A method for controlling a minimum level of pressure in a first half of a metering section, as seen in a transport direction, in a vented single-screw extruder or a cascade extruder during transport of a molten thermoplastic, the vented single-screw extruder or the cascade extruder in each case having a first screw section, a venting zone, a metering section and a measurement control circuit, which includes a first pressure-measuring sensor in the first half of the metering section, a first controller and a first actuator for influencing the pressure in the metering section, wherein the pressure is measured by the first pressure-measuring sensor and is set by the first controller and the first actuator such that a minimum level at a location of the measurement is between 0.1 and 10 bar,
  wherein the extruder is a vented single-screw extruder with separate control of a temperature of a barrel in a region of the metering section, the minimum level of the pressure being controlled in the first half of the metering section as a result of the temperature of the barrel being increased in the region of the metering section when the pressure is too low.

29. The method according to claim 28, wherein the measurement control circuit includes a measurement amplifier that filters out the minimum level of the pressure and provides a value of the minimum level for control purposes.

30. The method according to claim 28, further comprising a screw drive equipped with a rotation sensor, located on the drive itself or on a shaft that runs synchronously with the drive, a rotation signal being taken into account in controlling of the minimum level of the pressure in the first half of the metering section.

31. The method according to claim 28, including a second measurement control circuit, including a second pressure-measuring sensor, located downstream of a screw tip of the metering section, a second controller and a second actuator, and wherein the pressure is measured by the second pressure-measuring sensor and is set by the second controller and the second actuator such that a maximum level of the pressure is limited at a location of measurement.

32. The method according to claim 28, wherein the extruder is a vented single-screw extruder with a melt gear pump, located downstream of the metering section, the minimum level of the pressure being controlled in the first half of the metering section as a result of the rotational speed of the drive motor being increased when the pressure is too low.

33. The method according to claim 28, wherein the extruder is a vented single-screw extruder with an adjustable flow restrictor, located downstream of the metering section, the minimum level of the pressure being controlled in the first half of the metering section as a result of the flow restrictor being closed when the pressure is too low.

34. The method according to claim 28, wherein the extruder is a vented single-screw extruder with a restrictable bypass which, in an open state, returns melt from a space downstream of the metering section to the first half of the metering section, the minimum level of the pressure being controlled in the first half of the metering section as a result of the bypass being opened when the pressure is too low.

35. The method according to claim 28, wherein the extruder is a cascade extruder and the minimum level of the pressure is controlled in the first half of the metering section as a result of a rotational speed of a drive motor for a screw part in the metering section being reduced when the pressure is too low.

36. The method according to claim 28, wherein the thermoplastic which is processed is a polyethylene terephthalate, a polybutylene terephthalate, a polyamide, a polystyrene, a polymethyl methacrylate, a polycarbonate, impact-modified polymethyl methacrylate or another mixture (blend) of two or more thermoplastics.

\* \* \* \* \*